Figure 1:
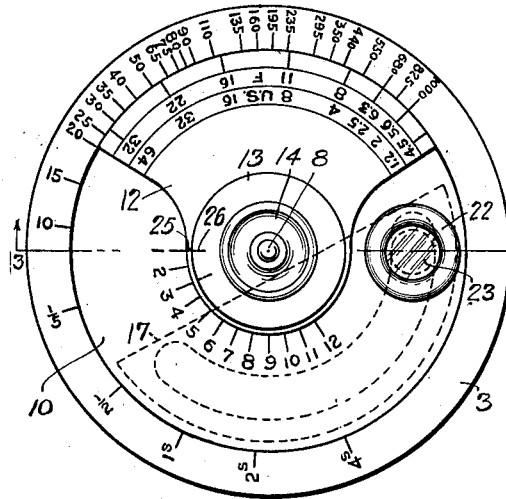

T. McG. AIKEN.
COMPUTING EXPOSURE METER.
APPLICATION FILED AUG. 14, 1920.

1,414,972.                                              Patented May 2, 1922.

INVENTOR
Thomas McG. Aiken
By Kay, Totten & Brown
Attorneys

UNITED STATES PATENT OFFICE.

THOMAS McG. AIKEN, OF PITTSBURGH, PENNSYLVANIA.

COMPUTING EXPOSURE METER.

1,414,972.              Specification of Letters Patent.      Patented May 2, 1922.

Application filed August 14, 1920. Serial No. 403,478.

*To all whom it may concern:*

Be it known that I, THOMAS McG. AIKEN, a citizen of the United States, and resident of N. S. Pittsburgh, in the county of Allegheny and State of Pennsylvania, have invented a new and useful Improvement in Computing Exposure Meters; and I do hereby declare the following to be a full, clear, and exact description thereof.

My invention relates to exposure meters for use in photography, and it has for its object to provide an instrument which shall indicate directly, and without computation on the part of the operator, the correct exposure in accordance with the illumination of the subject to be photographed and the negative to be used.

Another object of my invention is to provide an exposure meter of the above-indicated character which shall operate by direct observation of the subject to be photographed, and which can be adjusted by every photographer according to the error, if any, in his individual vision.

One of the chief difficulties met with in photography, especially by amateur photographers, is the correct estimation of the light values presented by the subject that is to be photographed and the selection of the corresponding diaphragm aperture and the time of exposure. In the case of most amateur photographers, this is largely a matter of guess work, and consequently a large proportion of the resulting pictures are more or less imperfect.

Numerous attempts have been made to assist the photographer in the proper selection of his diaphragm apertures and exposure times, and numerous devices have been made in the nature of tables or charts prepared for different light conditions and for different kinds of plates or films. Such tables are voluminous and require considerable study and practice to arrive at the correct result, and at best the indicated result is only approximate, because the operator must first of all estimate for himself whether the illumination is bright, hazy, dark, and so on. Other instruments have been devised in which the preliminary estimate of the prevailing light conditions is made by exposing a sensitized surface to the light or by looking at the object to be photographed through a glass screen of varying thickness. With these instruments the same process of consulting tables and computing the time and diaphragm opening must be gone through and, in the case of the light-sensitive actinometers, mentioned above, there is considerable variation in the sensitive papers employed, which introduces another source of error into the computations.

My present invention aims to do away with substantially all of the work described above and to enable the photographer, in a single operation, to arrive at the final result desired, namely, the time of exposure that is required for any given diaphragm aperture and for any commercial negative. To this end, I provide an instrument having two relatively movable parts arranged adjacent to each other, one carrying a scale graduated to represent diaphragm apertures and the other graduated with a scale representing seconds and fractions of seconds. These scales are made adjustable for different speeds of negatives, and also for the personal vision of the operator. Associated with these movable parts and arranged to be relatively moved with them are an eyepiece and a tapered wedge of colored glass, the glass being uniformly colored blue or some other color admitting a preponderance of actinic light. The eyepiece and the glass wedge are so arranged that one may be moved with respect to the other so as to cause the eyepiece to be moved from the thin end of the wedge to the thick end, or vice versa. The instrument is used by looking through the eyepiece at the object to be photographed and moving the glass wedge relative to the eyepiece until the object substantially disappears from view on account of the increased thickness of the glass in front of the eyepiece. This relative movement of the eyepiece and glass wedge produces a corresponding movement of the time scale and the diaphragm scale, so that when the observation is taken in the manner described, the two scales are in position to show the correct exposure time corresponding to each stop shown on the diaphragm scale. When the adjustment for the speed of the negative is once made, it is not changed as long as the same kind of negative is being used, while the adjustment for the personal vision of the operator is never changed while the instrument is being used by the same person.

Figure 2:
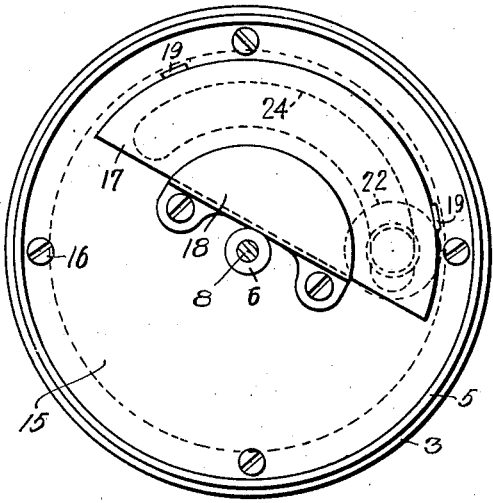
Figure 3:
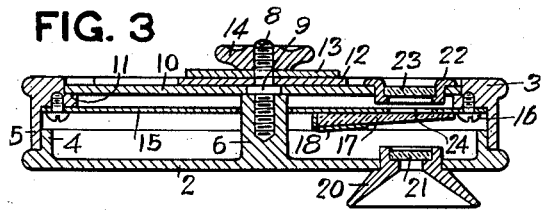
Figure 4:
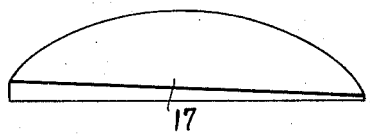
Figure 5:
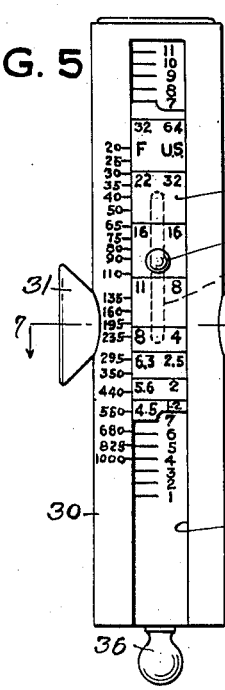
Figure 6:
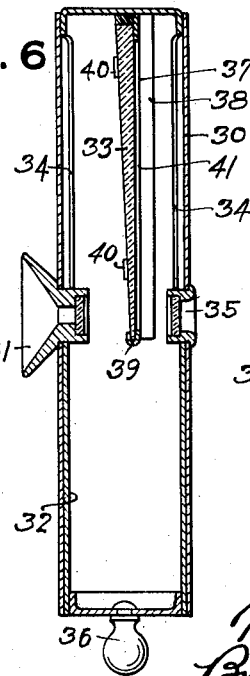
Figure 7:
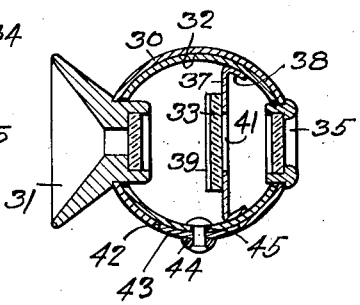

For a further understanding of my invention reference may now be had to the accompanying drawing, in which Fig. 1 is a top plan view of one form of instrument constructed in accordance with my invention; Fig. 2 is a bottom plan view of the upper portion of the same instrument; Fig. 3 is a cross-section taken centrally through Fig. 1 on the line 3—3; Fig. 4 is a perspective view of the glass wedge employed in the same instrument; Fig. 5 is a side elevational view of a modified form of instrument; Fig. 6 is a vertical central sectional view of the instrument of Fig. 5; and Fig. 7 is a cross section of the same instrument on the line 7—7, Fig. 5.

The instrument shown in Figs. 1 to 4 consists of a circular plate 2 and a ring 3, the plate 2 and the ring 3 having telescoping flanges 4 and 5. The plate 2 has a central projection or hub 6 having a tapped opening to receive a screw 8. The screw 8 has a squared shoulder 9 that fits in a corresponding opening in a disc 10 that rests upon an annular shoulder 11 formed on the ring 3. The squared shoulder 9 serves to attach the plate 2 and the disc 10 rigidly together, while the ring 3 is free to turn with relation to these parts. A segmental scale member 12, having a pivotal opening fitting over the screw 8, is clamped between the disc 10 and a spring washer 13 which is pressed down upon the scale member 12 by means of a thumb nut 14.

Between the plate 2 and the disc 10 is disposed a disc 15 which is attached to the ring 3 by means of screws 16 and has a central opening that surrounds the projection 6. The disc 15 carries a glass wedge 17 which is attached to the disc by means of a semi-circular clamp 18 and outer clamping lugs 19.

The plate 2 carries an eyepiece 20 having a lens of plain glass 21 and the disc 10 is provided with an opening opposite to the eyepiece 20 in which is received a bushing 22 that carries a disc of plain glass 23.

The disc 15 which carries the glass wedge 17 is provided with a curved slot 24 to enable the observer to look through the eyepiece and the wedge for all positions of the eyepiece with respect to the wedge.

As shown in Fig. 1 the ring 3 is provided with a series of graduations representing seconds and fractions of seconds corresponding to the shutter speeds commonly employed in focal-plane cameras, while the scale member 12 is provided at its outer curved edge with a series of graduations representing diaphragm stops. I provide two sets of figures to designate the stops, the one series marked "US" and the other series marked "F". Other sets of graduatons may evidently be provided, corresponding to the shutter speeds employed in cameras having iris diaphragms.

The scale member 12 is also provided with a zero-mark 25 which is adapted to co-operate with a series of graduations marked on the disc 10. These graduations, which are numbered from 1 to 12 inclusive, enable the disc member 12 to be adjusted according to the speed of the plate or film with which the instrument is to be used. Each of the divisions of this scale may be conveniently made to represent one fourth of the common standard speed-unit employed to designate commercial plates and films.

Every instrument that operates by direct vision is subject to error on account of the differences between the eyes of different observers. I compensate for such differences by providing an additional adjustment of the scale member 12. For this purpose, the spring washer 13 carries one or more auxiliary zero marks 26 at its outer edge. If the operator's eye is normal, which he discovers by obtaining uniformly good results without the vision adjustment, this adjustment is not used at all. If, however, he finds that his vision is above or below the normal, the instrument is adjusted by loosening the nut 14 and turning the washer 13 until the zero-mark 26 is moved a sufficient distance from its normal position, the correct amount being determined by trial. The auxiliary zero-mark 26 is then used instead of the zero-mark 25, and this adjustment remains constant while the same person is using the instrument. For example, the mark 26 is shown on Fig. 1 in a dotted-line position opposite to the division 3 on the negative scale. This would be the correct personal adjustment for a person whose vision is below normal in the proportion that a negative represented by the scale-member 3 is slower than the negative represented by the member 1. The vision adjustment may also be used, if necessary, to correct for errors in the camera shutter.

The instrument shown in Figs. 5, 6 and 7 is constructed on the same principle as the instrument in Figs. 1 to 4 but is of generally cylindrical form. It consists of an outer tube 30 carrying an eyepiece 31 and an inner tube 32 carrying a straight wedge 33 and having opposite slots 34 surrounding the eyepiece 31 and the objective 35 which is carried by the outer tube 30 opposite to the eyepiece 31. The inner tube 32 is closed at both ends and a knob 36 is attached to the lower end for moving the inner tube lengthwise within the outer tube. The glass wedge 33 is supported within the tube 32 by means of a metal strip 37 having horizontal flanges 38 and clamps 39 and 40. The strip 37 is slotted at 41 to enable the observer to look through the eyepiece and the wedge.

As shown in Fig. 5 the outer tube 30 is provided with a slot 42 at the edge of which is a series of time graduations similar to the graduations on the ring 3 in the modification first described. A metal strip 43 is received within the slot 42 and is attached to the inner tube 32 by means of a rivet or button 44, the inner tube being slotted at 45 to permit of the adjustment of the strip 43 with relation to a series of graduations carried by the inner tube 32, these graduations representing various speeds of plates and films, and being numbered from 1 to 12 as in the instrument of Fig. 1.

In using the instrument shown in Figs. 1 to 4, the zero-mark 26 is first adjusted, if necessary, for the personal vision of the user, in the manner described above. The scale member 12 is then adjusted by means of the zero-mark 25 or 26 and its adjacent negative scale, in accordance with the plates or films that are to be used, the information necessary for this adjustment being supplied in a table furnished with the instrument and giving the proper scale division, from 1 to 12, corresponding to the numerous commercial plates and films. No further adjustment is required as long as plates or films of the same kind are being used. When the photographer is about to take a picture, he looks at the subject to be photographed through the eyepiece 20 and turns the ring 3 carrying the wedge 17 until the part of the subject which shows the greatest light contrast is barely visible. This point will of course vary in accordance with the intensity of the light and the instrument automatically compensates for all degrees of illumination without the necessity of any estimating on the part of the operator. While the ring 3 is being moved to bring the glass wedge to the proper position opposite to the eyepiece, the scale is of course moved correspondingly with respect to the scale of stops carried by the scale member 12 and when the observation is completed the operator has only to observe the relative position of the time scale and the scale of stops to learn the correct exposure time required for each of the several stops. In Fig. 1, for example, the eyepiece is opposite to the thickest portion of the wedge 17 which indicates that the subject to be photographed is intensely illuminated. On consulating the scale it is found that if the shutter be set to stop F5.6 the correct exposure will be one-one thousandth of a second while, if stop F32 is employed the correct exposure is between one-twenty-fifth and one-thirtieth of a second.

The opening through the eyepiece is made sufficiently small so that the pupils of the eyes of all observers will be brought to substantially the same size. This compensates for the differences which exist between different persons as to the size of the pupil for a given amount of light, and so increases the accuracy of the instrument.

The instrument of Figs. 5, 6 and 7 is used in a manner similar to that described above. The preliminary adjustment for the speed of the plate or film to be employed is made by moving the strip 43 until the upper or lower edge of the strip rests upon the proper graduation. The operator looks through the eyepiece and moves the inner tube 32 by means of the knob 36 until the observation is taken and then consults the scale shown in Fig. 5 which gives him the correct exposures for the several stops. In Figs. 5 and 6 the eyepiece is shown opposite to the thinnest portion of the wedge 33 which would be the condition reached when observing an object of low illumination. It will be observed that the stop F5.6, which in Fig. 1 corresponds to about one-one thousandth of a second, now corresponds to about one-three hundred and fiftieth of a second.

I am aware that there are other instruments by which the subject to be photographed is viewed through a transparent wedge for the purpose of determining the light intensity of the subject but such instruments give only a base figure as a result of the observation, which figure must be used as the base for a complicated set of computations before arriving at the final result, unless the negatives used happened to be of the same speed as that on which the instrument is calculated.

I believe that I am the first to produce a direct-observing computing exposure meter which utilizes a single observation to produce the final result, which is, the correct exposure time to be given in order to properly photograph the subject upon the particular negative that is used.

The expression "computing" in the appended claims is intended to mean that my instrument gives directly, after one obesrvation through the instrument, the correct exposure reading, without any intervening estimates or computations. Where the claims refer to "local conditions of use" this expression is intended to mean any one or more of the above described conditions requiring preliminary adjustment, namely, the speed of the negative, the personal vision of the operator, or the special characteristics of the camera.

The principles of my invention may be utilized in various ways and by instruments constructed otherwise than in the examples herein shown. I therefore desire that the foregoing description and the accompanying drawing be taken as merely illustrative and that no limitations be imposed on my invention except such as are indicated in the appended claims.

What I claim is:

1. An exposure meter for use in photography comprising means operated in accordance with direct observation therethrough for measuring the light value of the subject to be photographed, indicating means operatively connected to the said light measuring means for indicating the correct exposure for the said subject, and means for preliminarily adjusting the said indicating means in accordance with local conditions of use.

2. An exposure meter for use in photography comprising two relatively movable scales for indicating exposure times and shutter apertures respectively, means for preliminarily adjusting the relative positions of said scales in accordance with local conditions of use, and means, operable in accordance with direct observation therethrough, for measuring the light value of the subject to be photographed, the said light-measuring means being operatively connected to relatively move said time and aperture scales, thereby indicating directly the correct exposure for the said subject.

3. A computing exposure meter for use in photography comprising means for determining by direct observation through a portion of the instrument the light value of the subject to be photographed, means associated with the said light determining means and operable simultaneously therewith for indicating directly the correct exposure for the said subject, and means for preliminarily adjusting the said indicating means in accordance with the speed of the negative to be used.

4. A computing exposure meter for use in photography comprising means for determining by direct observation through a portion of the instrument the light value of the subject to be photographed, means associated with the said light determining means for indicating automatically and directly the correct time of exposure for any one of a series of diaphragm apertures, and means for preliminarily adjusting the said indicating means in accordance with the speed of the negative to be used.

5. A computing exposure meter for use in photography comprising two adjacent and relatively movable scale members graduated to indicate times of exposure and diaphragm apertures respectively, means for determining by direct observation through a portion of the instrument the light value of the subject to be photographed, the said light measuring means being operatively connected to relatively move the said scales, and means for preliminarily adjusting the relative position of the said scales in accordance with the personal vision of the operator.

6. A computing exposure meter for use in photography comprising means for determining by direct observation through a portion of the instrument the light value of the subject to be photographed, a member carrying an exposure indicating schedule the said member being controlled by the said light-determining means to indicate the correct exposure for the said subject, and means for adjusting the said schedule-carrying member for various speeds of negatives.

7. A computing exposure meter for use in photography comprising means for determining by direct observation through a portion of the instrument the light value of the subject to be photographed, a member carrying an exposure indicating schedule controlled by the said light-determining means to indicate the correct exposure for the said subject, and means for adjusting the said schedule-carrying member for various speeds of negatives and for differences in the eyes of individual operators.

8. A computing exposure meter for use in photography comprising two adjacent and relatively movable scale-members graduated to indicate times of exposure and diaphragm apertures respectively, and means for preliminarily adjusting the portion of one of the said scale members with respect to the other for various speeds of negatives.

9. A computing exposure meter for use in photography comprising two adjacent and relatively movable scale-members graduated to indicate times of exposure and diaphragm apertures respectively, means for preliminarily adjusting one of the said scale members for various speeds of negatives, and means for additionally adjusting the said adjustable scale member to compensate for differences in the eyes of individual operators.

10. A computing exposure meter for use in photography comprising adjacent and relatively movable scales for indicating exposure times and diaphragm apertures, and means visually controlled in accordance with direct observation of the object to be photographed through a portion of the instrument for setting the relative position of said scales in a single operation and in correct accordance with the light-intensity of the object to be photographed.

11. A computing exposure meter for use in photography comprising means for observing the light-intensity of the object to be photographed by direct observation of the said object through a portion of the instrument, and means, operable in response to movement of the said observing means, for directly indicating the correct exposure time for a given diaphragm aperture.

12. A computing exposure meter for use in photography comprising means for observing the light-intensity of the object to be photographed, by direct observation of the said object through a portion of the said instrument, and means, operable in response to movement of the said observing means, for directly indicating the correct exposure times for a plurality of diaphragm apertures.

13. A computing exposure meter for use in photography comprising two adjacent and relatively movable scale members respectively indicating exposure times and diaphragm apertures, and means for securing the said scale members in adjusted position with respect to each other in accordance with the speed of the negatives to be used.

14. A computing exposure meter for use in photography comprising two adjacent and relatively movable scale members respectively indicating exposure times and diaphragm apertures, means for securing the said scale members in adjusted position in accordance with the speed of the negatives to be used, and means for additionally adjusting the said scale members to compensate for differences in the vision of individual operators.

15. A computing exposure meter for use in photography comprising two adjacent and relatively movable scale members respectively indicating exposure times and diaphragm apertures, a third scale disposed adjacent to one of the said scale members for indicating various speeds of negatives, and means for adjustably securing together the said third scale and the adjacent scale member.

16. A computing exposure meter for use in photography comprising two relatively movable members, one member carrying a piece of glass transparent to actinic light and of progressively varying thickness, and the other member carrying an eyepiece for looking through the said glass, and two scale members mounted adjacent to each other and relatively movable in response to movement of the said first-named movable members, one of the said scale members being graduated to indicate diaphragm apertures, and the other being graduated to indicate exposure times on said aperture scale.

17. A computing exposure meter for use in photography comprising two relatively movable members, one member carrying a piece of glass transparent to actinic light and of progressively varying thickness, and the other member carrying an eyepiece for looking through the said glass, and two scale members, mounted adjacent to each other and fixed respectively to the said relatively movable members, one of the said scale members being graduated to indicate diaphragm apertures, and the other being graduated to indicate exposure times on said aperture scale.

18. A computing exposure meter for use in photography comprising a member carrying a wedge of glass transparent to actinic light, the said member being also provided with a scale, and a second member movably associated with the said first-named member and carrying an eyepiece adapted to be moved along the said wedge in the direction of its progressively varying thickness, the said second member being also provided with a scale, the two said scales being adjacent to each other and being graduated to indicate exposure times and diaphragm apertures respectively.

19. A computing exposure meter for use in photography comprising a member carrying a wedge of glass transparent to actinic light, a second member movably associated with the said first-named member and carrying an eyepiece adapted to be moved along the said wedge in the direction of its progressively varying thickness, a scale member carried by one of the said first-named members, a scale disposed adjacent to the said scale member for indicating various speeds of negatives, means for adjustably securing together the said scale member and the member carrying the said scale member, and a set of graduations disposed on each of the said first-named members, the said sets of graduations being adjacent to each other and indicating exposure times and diaphragm apertures respectively.

In testimony whereof, I, the said THOMAS McG. AIKEN, have hereunto set my hand.

THOMAS McG. AIKEN.

Witnesses:
R. D. BROWN,
W. S. THOMPSON.